United States Patent [19]

Landell et al.

[11] Patent Number: 4,811,399

[45] Date of Patent: Mar. 7, 1989

[54] APPARATUS AND METHOD FOR AUTOMATIC SPEECH RECOGNITION

[75] Inventors: Blakely P. Landell, San Diego; Robert E. Wohlford, Poway, both of Calif.

[73] Assignee: ITT Defense Communications, a Division of ITT Corporation, Nutley, N.J.

[21] Appl. No.: 207,018

[22] Filed: Jun. 14, 1988

Related U.S. Application Data

[63] Continuation of Ser. No. 687,610, Dec. 31, 1984, abandoned.

[51] Int. Cl.⁴ ................................................ G10L 5/00
[52] U.S. Cl. ...................................................... 381/43
[58] Field of Search ........................ 381/43; 364/513.5

[56] References Cited

U.S. PATENT DOCUMENTS 4,481,593 11/1984 Bahlen .............................. 364/513.5
4,489,435 12/1984 Moshier ................................. 381/43

Primary Examiner—Emanuel S. Kemeny
Attorney, Agent, or Firm—Robert A. Walsh; Thomas N. Twomey; Mary C. Werner

[57] ABSTRACT

An apparatus for automatic speech recognition includes a plurality of processors, including template processors in which there are stored templates representative of both speech and non-speech sounds. Incoming sounds are continuously converted into digital signals in respective frames representative of speech and non-speech sounds, respectively. Sequences of such frames are compared with both the speech and non-speech templates to determine the closest matches. Endpoints of respective speech utterances are determined in response to the detection of respective non-speech-speech-non-speech sequences, whereupon such speech utterances are processed to recognize the same.

3 Claims, 3 Drawing Sheets

APPARATUS AND METHOD FOR AUTOMATIC SPEECH RECOGNITION

This application is a continuation, of application Ser. No. 687,610, filed Dec. 31, 1984, now abandoned.

BACKGROUND OF THE INVENTION

This invention relates to an apparatus and method for automatic speech recognition.

Automatic speech recognition systems provide means for human beings to interface with communication equipment, computers and other machines in a mode of communication which is most natural and convenient to humans. Where required, this will enable operators of telephones, computers, etc. to call others, enter data, request information and control systems when their hands and eyes are busy, when they are in the dark, or when they are unable to be stationary at a terminal. Also, machines using normal voice input require much less user training than do systems relying on complex keyboards, switches, push buttons and other similar devices.

One known approach to automatic speech recognition of isolated words involves the following: periodically sampling a bandpass filtered (BPF) audio speech input signal; monitoring the sampled signals for power level to determine the beginning and the termination (endpoints) of the isolated words; creating from the sampled signals frames of data and then processing the data to convert them to processed frames of parametric values which are more suitable for speech processing; storing a plurality of templates (each template is a plurality of previously created processed frames of parametric values representing a word, which when taken together form the reference vocabulary of the automatic speech recognizer); and comparing the processed frames of speech with the templates in accordance with a predetermined algorithm, such as the dynamic programming algorithm (DPA) described in an article by F. Itakura, entitled "Minimum prediction residual principle applied to speech recognition", IEEE Trans. Acoustics, Speech and Signal Processing, Vol. ASSP-23, pp. 67–72, February 1975, to find the best time alignment path or match between a given template and the spoken word.

Isolated word recognizers such as those outlined above require the user to artificially pause between every input word or phrase. However, problems are still encountered in properly identifying the word boundaries, especially since extraneous non-speech sound originating in the environment of the recognition apparatus or even with the user of the latter such as lip smacks, tongue clicks or the like) may have power levels sufficient to indicate to the processive equipment the occurrence of a sound to be processed so that the processing may begin with such extraneous sounds and bring about non-recognition of the subsequent speech sounds.

It is therefore, desirable to combine the relative ease of implementation of an isolated word recognizer with the advantages of continuous speech recognition in a single, inexpensive and less complex automatic speech recognition machine.

Accordingly, it is an object of the present invention to provide a method and an arrangement for recognizing the endpoints of words and other utterances based on other criteria than merely the power level of the received sounds.

SUMMARY OF THE INVENTION

An apparatus and method for speech recognition in accordance with a predetermined syntax is disclosed. The speech comprises isolated words or other utterances separated by pauses of unpredictable durations. Moreover, non-speech sounds such as ambient noise or noises generated by the speaker may be present. According to the present invention, speech signal recognition as well as non-speech signal recognition are continuously performed by comparing speech templates and non-speech templates stored in a memory with frames of digital signals representative of speech or non-speech in accordance with a Dynamic Programming Algorithm (DPA). The endpoints of the speech sounds are determined from the detection of each succession of non-speech-speech-non-speech signals.

BRIEF DESCRIPTION OF THE DRAWINGS

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
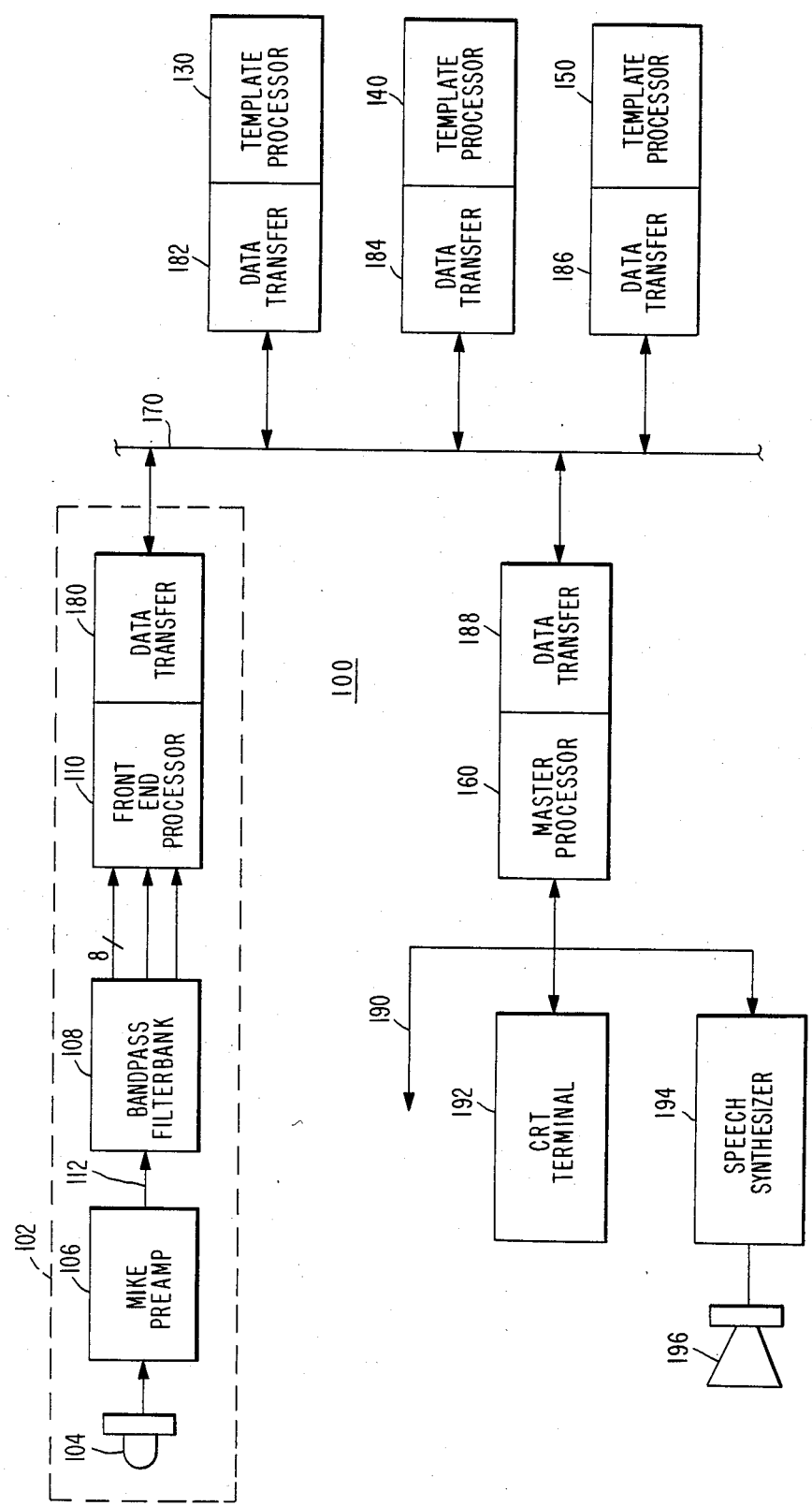
FIG. 1 is a block diagram of a basic speech recognition apparatus which may be used in accordance with the present invention.

Referring now to the drawing in detail and first to FIG. 1 thereof, it may be seen that the reference numeral 100 has been used therein to identify in a block diagram a currently preferred construction of a distributed processor apparatus particularly adapted for a speech recognition, as an example of the apparatus in which the present invention may be embodied and employed. The apparatus 100 comprises a speech converting means designated generally 102 which includes a microphone 104, such as a Shure Brothers, Inc. Model SM10; a preamplifier circuit 106, such as Bogen Co. Model No. PMM-2 circuit for amplifying the audio input to the microphone 104; a bandpass filter bank circuit 108, such as described in more detail in FIG. 2, for providing a digital spectrum sampling of the audio output of the preamplifier circuit 106; and a front end processor 110 for processing the spectrum samples to convert them to parametric data more suitable for further speech processing. The apparatus 100 further comprises a plurality of template processors such as processors 130, 140 and 150, which store previously processed words or portions of speech called templates, the template processors functioning to compare the parametric data from the front end processor 110 with the stored templates in accordance with a predetermined algorithm and to store the results; a master processor 160 for syntax analysis of the results received from the plurality of template processors 130, 140 and 150 for controlling transfer of data between and/or among the processors 110, 130, 140 and 150, and for performing other system wide functions; a remote connecting bus 170 for providing data flow and control signals among the various processors; and data transfer means 180, 182, 184, 186 and 188 associated with each of the processors 110, 130, 140, 150 and 160, respectively.

FIG. 1 also shows the following additional features: connection of the master processor 160 to a host computer or mass storage via bus 190; a connection to a CRT terminal 192, and a connection to a voice synthesizer 194, such as a National Semiconductor DT1000 Digitalker, and a speaker 196.

Figure 2:
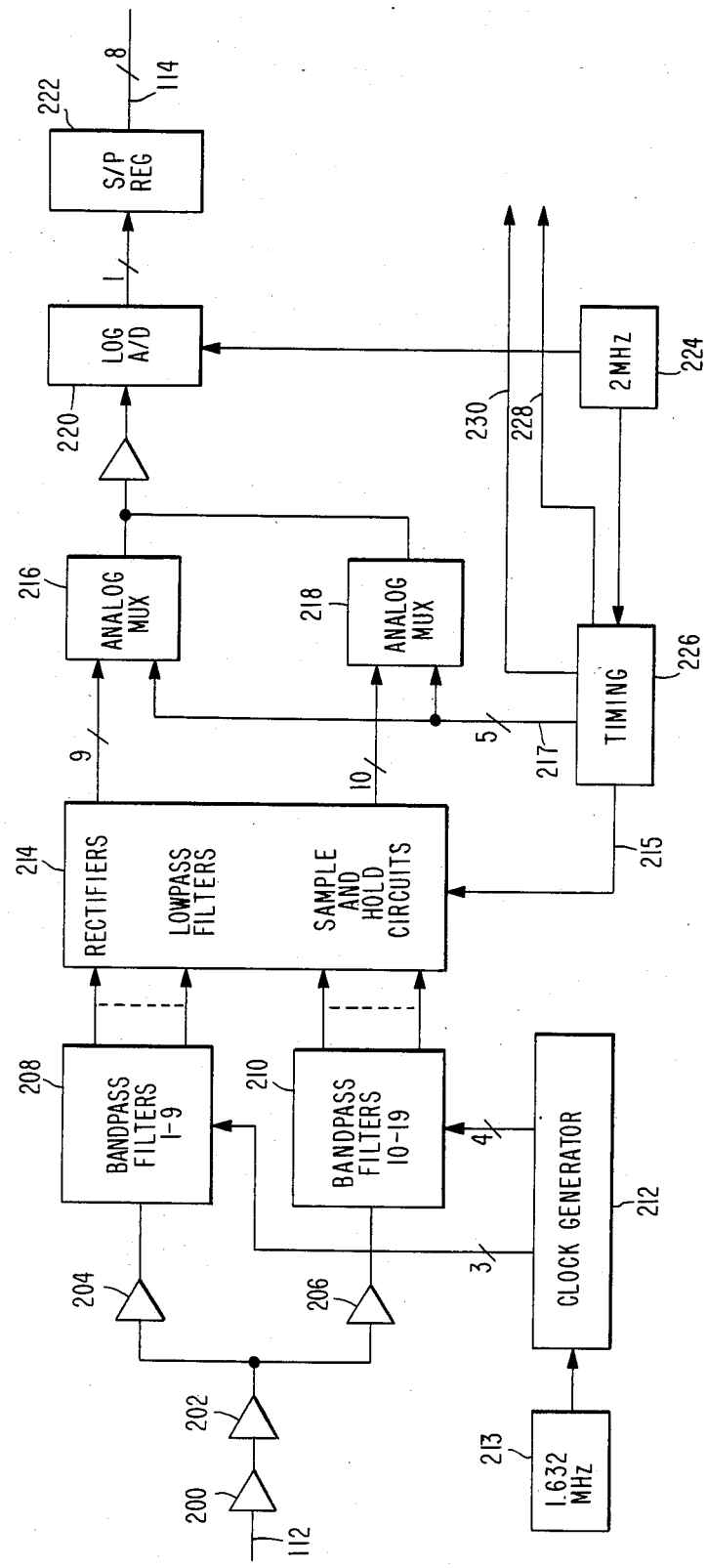
FIG. 2 is a more detailed block diagram of the 9 bandpass filter portion of the apparatus of FIG. 1.

Referring now to FIG. 2, it may be seen that a more detailed block diagram of the bandpass filter bank circuit 108 is shown therein. The output from the preamplifier 106 on the lead 112 from FIG. 1 is transmitted to an input amplifier stage 200 which has a 3 dB bandwidth of 10 kHz. This is followed by a 6 dB/octave preemphasis amplifier 202 having selectable frequencies of 500 or 5000 Hz. It is conventional practice to provide more gain at higher frequencies than at lower frequencies since the higher frequencies are generally lower in amplitude in speech data. At the output of the amplifier 202, the signal is split and is provided to the inputs of anti-aliasing filters 204 (with a cutoff frequency of 1.4 kHz) and 206 (with a cutoff frequency of 10.5 kHz). These are provided to eliminate aliasing which could otherwise result because of subsequent sampling.

The outputs of the filters 204 and 206 are provided to bandpass filter circuits (BPF) 208 and 210, respectively. The BFP 208 includes channels 1-9 while the BPF 210 includes channels 10-19. Each of the channels 1-18 contains a one octave filter. Channel 19 contains a full octave filter. The channel filters are implemented in a conventional manner, for instance, using Reticon Model Numbers R5604 and R5606 switched-capacitor devices. The bandpass filter clock frequency inputs required for the BPF circuits 208 and 210 are generated in a conventional manner from a clock generator circuit 212 driven by a 1.632 MHz clock 213.

The outputs of the BPF circuits 208 and 210 are rectified, low pass filtered (cutoff frequency=30 Hz and sampled simultaneously in 19 sample and hold circuits (such as National Semiconductor Model No. LF398) in a sampling circuitry 214. The 19 channel samples are then multiplexed through multiplexers 216 and 218 (Siliconix Model No. DG506) and converted from analog to digital signals in a log A/D converter 220, such as a Siliconix device, Model No. DF331. The converter 220 has an 8 bit serial output which is converted to a parallel format in a serial to parallel register 222 (such as National Semiconductor Model No. DM86LS62) for input to front end processor 110 via a bus 114.

A 2 MHz clock 224 generates various timing signals for the circuitry 214, the multiplexers 216 and 218 and for the A/D converter 220. A sample and hold command is sent to circuitry 214 once every 10 milliseconds over a lead 215. Then each of the sample and hold circuits is multiplexed sequentially (one every 500 microseconds) in response to a five bit selection signal transmitted via a bus 217 to the circuits 216 and 218 from a timing circuit 226. Four bits are used by each circuit while one bit is used to select which circuit. It therefore takes 10 milliseconds to A/D convert the 19 sampled channels plus a ground reference sample. These 20 digital signals are called a frame of data. Once every frame a status signal is generated from timing generator circuit 226 and provided to front end processor 110 via a lead 228. This signals serves to synchronize the filter circuit 108 timing to the input of the end processor 110. The timing generator circuit 226 further provides a 2 kHz data ready strobe via a lead 230 to the front end processor 110. This provides 20 interrupt signals per frame to the processor 110.

The front end processor 110 is programmed in a well known manner (see, for instance, the Motorola Advance Information Booklet No. AD1-814-R1 for the MC68000 series 16 bit microprocessing units) to take the frames of data (each frame including 19 bandpass filter coefficients) and reduce each frame to 16 coefficients. Then, using a known process of variable frame rate encoding, redundant frames of data, i.e. similar frames of data, are eliminated to reduce further processing. Variable frame rate encoding reduces the frame rate from 100 frames/sec (each frame corresponding to 10 milliseconds) to 50 frames/sec on the average.

To further reduce processing, the 16 coefficients are reduced to a lesser number such as 5 or 10 by applying a linear transformation to each frame of coefficients to be further processed. One well known transformation is the mel-cosine linear transformation described in the following references: (1) Davis, S. B., and Mermelstein, P., "Evaluation of Acoustic Parameters for Monosyllabic Word Identification", Journal Acoust. Soc. Am., Vol. 64, Suppl. 1, pp. S180-S181, Fall 1978, (abstract); and (2) S. Davis and P. Mermelstein, "Comparison of Parametric Representations for Monosyllabic Word Recognition in Continuously Spoken Sentences", IEEE Trans. Acoust.., Speech, Signal Proc., Vol. ASSP-28 pp. 357-366.

Each word of the vocabulary that the apparatus 100 is capable of recognizing (in accordance with a predetermined syntax) can be represented by a sequence of a plurality of points taken from a multidimensional mel-cosine space described in the David and Mermelstein articles cited above. For example, a 300 word vocabulary can be represented by different sequences taken from 250 predetermined points. Each of these points after undergoing mel-cosine transformation is represented by 5 or 10 mel-cosine values called a character. There are then 250 characters of 5 or 10 mel-cosine values stored in a character matrix. Each new unknown frame of mel-cosine values to be recognized is converted to a character distance vector of 250 values by calculating the euclidean distances between the unknown frame and each of the characters in the character matrix. This is done in the front end processor 110. The character distance vectors are stored in a buffer in the processor 110 until they are transferred to the template processors by the master processor 160.

A template represents a reference portion of speech such as a vocabulary word constructed from a plurality of characters. Each template represents a word of the vocabulary of the apparatus 100. In a 300 word system, there would be approximately 300 templates stored within a plurality of template processors. The number of templates stored within a template processor and hence the number of template processors such as 130, 140 and 150 required depends on the amount of processing required and how much recognition delay is tolerated. It is estimated that with a 10% real time recognition delay, i.e. 0.3 second recognition delay on a 3 second long utterance, 3-4 template processors will be required.

Each template processor compares each character distance vector received from the front end processor 110 via the remote bus 170 with its assigned templates in accordance with a comparison algorithm programmed within the template processor's programming memory. A suitable algorithm for accomplishing this is the dynamic programming algorithm (DPA) (referred to earlier) or derivatives thereof. Since each character distance vector represents only between 10 and 30 milliseconds of speech time which is much less than the average time taken to speak a word as represented by a template, many character distance vectors must be compared against each template. One advantage of the DPA is that it compensates for as much as a 4:1 variation in the time taken to speak a word.

During system initialization, the master processor via the circuit means even numbers 182-188 and remote bus 170 will load templates into the template processors so that at the start of the recognition process, the computational load among the template processors will be approximately equal. The master processor 110 also tells each template processor 130, 140 and 150 which of its templates to process in accordance with the predetermined syntax, causes the character distance vector to be transferred to each of the template processors 130, 140 and 150 for comparison. The master processor 160 via an interrupt commands the template processors 130, 140 and 150 to begin processing the character distance vectors on a frame basis. When each template processor 130, 140 or 150 has run the DPA on each of the assigned templates for the latest character distance vector and obtained the results, it generates an interrupt to the master processor 160 informing it that the results are ready for transfer. Not all of the template processors 130, 140 and 150 will take the same amount of time in processing their assigned templates on a frame by frame basis. The amount of time it does take will be reported along with the DPA results to the master processor 160. The master processor 160 via the circuit means even numbers 182 through 188 and the bus 170 transfers the results from the template processors to itself 160. The master processor 10 performs a syntax analysis on the results that may cause new templates to be specified for processing on the next frame. Based on the syntax analysis and on the amount of time each template processor 130, 140 and 150 is using to process its assigned templates, templates are reallocated among the template processors by the master processor via the circuit means even numbers 182-188 and the remote bus 170. Then a new character distance vector is sent to the template processors 130, 140 and 150 and the process begins all over again until recognition is accomplished.

The master processor 160 has three main functions to perform, namely, that of performing syntax analysis from the results of the template processors on a frame basis; controlling the transfer of data via the circuit means even numbers 180-188 and the remote lines 170; and performing system-wide functions such as outputting results, providing an operation interface, etc. (other than directing data transfers).

As mentioned before, the above description is of an apparatus in which the present invention may be used. It will be appreciated, however, that other processing apparatus may be used instead. For further details of the above-described apparatus, reference may be had to commonly owned copending U.S. patent applications Ser. No. 439,018, filed Nov. 3, 1982 and Ser. No. 473,422, filed March 9, 1983.

In contrast to known speech recognition apparatus for recognition of isolated words and phrases, the apparatus of the present invention does not utilize power level detection for ascertaining the end points of the speech utterances, so that the corresponding circuitry is eliminated from the speech recognition apparatus. Rather, the present invention employs a continuous monitoring approach for detecting both speech and non-speech sounds. To this end, the template processors such as 130, 140 and 150 contain, in addition to or instead of certain speech templates, other templates which are representative of non-speech sounds. The frames obtained in the above-discussed manner are continuously supplied the front end processor 110, via the data transfer means even numbers 180-186 to the template processors 130, 140 and 150 for continuous comparison of such frames with the speech and non-speech templates stored in the template processors 130, 140 and 150. Between the individual utterances, all of the frames will be representative of non-speech sounds and hence no end point detection will take place. At the beginning of each speech utterance, the respective template processor 130, 140 and 150 will detect the switch from a non-speech sound frame to a speech sound frame, whereupon the master processor 160 will cause the template processors 130, 140 and 150 to establish a path for the respective sound or utterance in the manner disclosed in the above-mentioned applications and in accordance with the predefined syntax as determined by the DPA.

Figure 3:
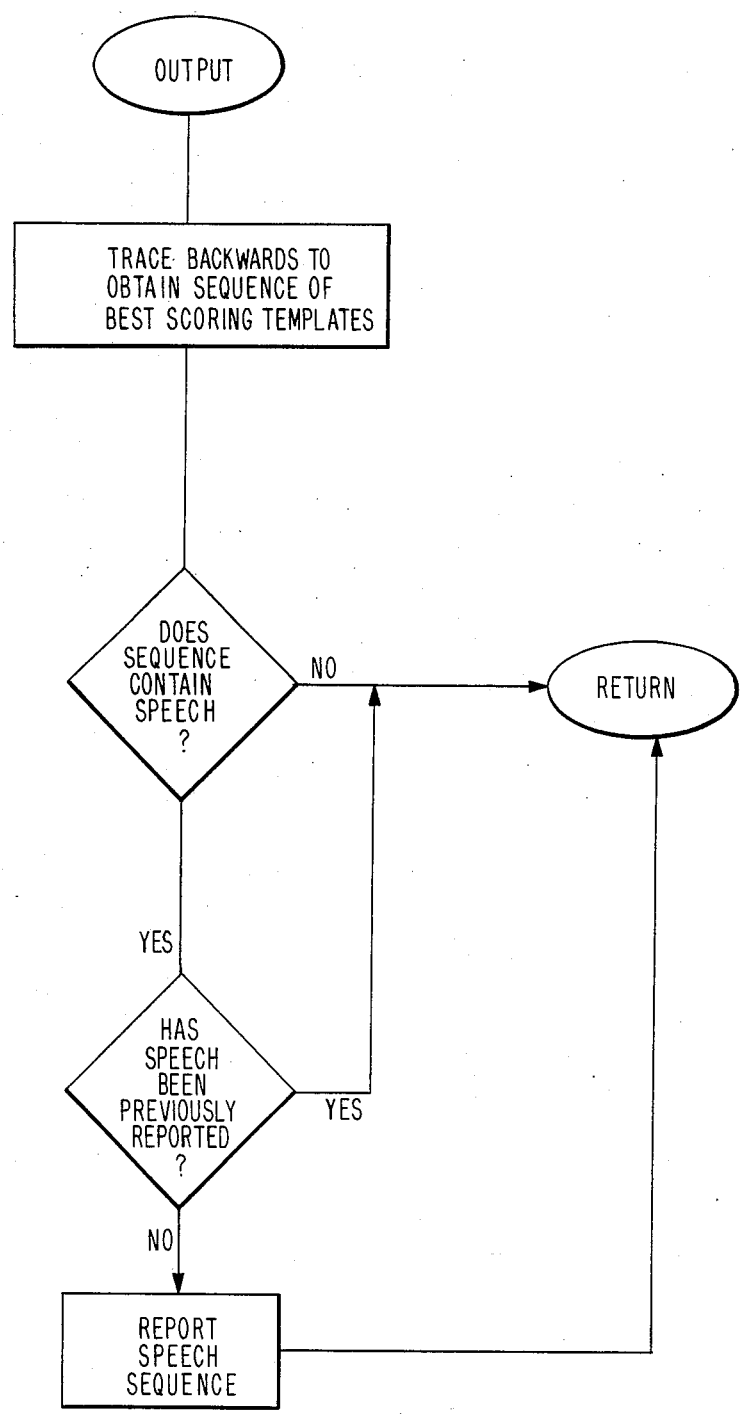
FIG. 3 is a flow chart.

A flow diagram of this procedure is presented in FIG. 3 of the drawing. It will be appreciated that the respective processors 110, 130, 140, 150 and 160 will contain the hardware for accomplishing the sequence of operations depicted in FIG. 3. It may be seen therein, that the output of the front end processor 110 as supplied to the respective template processor 130, 140 or 150 is traced backwards to obtain a sequence of best scoring templates, that is of templates which most closely approximate the traced series of frames. Then, if it is determined that the traced sequence does not contain speech, the system loops back or returns to be ready for the examination of the next following frame sequence. On the other hand, once it is established that this sequence contains speech, an examination is made to determine whether or not the speech has been previously reported. If the answer to this question is in the positive, the system is returned or looped back for the processing of the next following sequence. On the other hand, if no speech has been previously reported, such reporting is done at this time, so that the system is informed of the fact that speech is in progress and continues to process the speech in the same manner as in the known speech recognition apparatus 100 described above. At the end of the respective utterance, a similar examination is performed for the sequence of speech-non-speech, thus reporting to the system the termination of the utterance. The flow diagram of this procedure would be akin to that described above, so that it is not being separately presented here.

The above-described template determined end point approach is attractive because it uses the recognition algorithm to find the end points, thereby eliminating the previously used ad hoc end point detection component which have little in common with the remainder of the recognition system. The above-described automatic speech recognition (ASR) system is a syntax driven, dynamic programming based pattern matcher, which is a powerful classification tool. Thus, the template determined end point approach actually simplifies rather than complicates the overall ASR algorithm. This is a very desirable feature.

In the template determined implementation of the end point detection, the syntax which is being used to control the recognition process is first modified by including a self-looping non-speech node which, in operation, precedes and follows the existing finite state grammar and any paths to a final syntax node are modified to link to the non-speech node. The non-speech node must contain at least one ambient noise template but preferably contains multiple non-speech noise models. In the case of isolated word recognition, the syntax consists of just two nodes: the non-speech node and a second node which specifies each isolated word in the vocabulary.

Two algorithm changes were required in order to accomplish the ongoing recognition aspect of the template determined approach. The first change was the insertion of a new output routine which asks the question "has the recognition system found a speech sequence which has not been previously reported?". If the answer to this question is yes, the phrase representing the speech portion of the match is output and processing continues. Secondly, this implementation accumulates match scores in 16-bit registers, these scores having to be globally rescaled about once a minute since the recognition process is ongoing. Because the recognition continues indefinitely, accumulated DPA scores and phrase scores must be rescaled so as not to exceed the registers. The present implementation compares the pruning threshold to a constant (32,000) each frame. If the threshold exceeds the constant, then all scores in the system are rescaled by subtracting the minimum score in the phrase tables. This minimum score must be subtracted from each DPA end phrase score. An alternative approach would be to rescale all scores after each output phrase.

An isolated word application does not require a within phrase silence template. However, if the algorithm is to be effective in connected speech, a silence template is necessary. It will contain the same parameters as the noisy non-speech template. However, a test will be performed so that it is not allowed to loop on itself, as such looping would interfere with the speech-non-speech sequence. The duration of the non-speech templates should be a minimum of 500 milliseconds so that the template cannot fit in lengthly stop gap regions. The duration of the silence template should be 100 milliseconds so that the maximum gap it can bridge is less than the minimum non-speech warp (given the 1:2 and 2:1 DPA constraints). The silence duration should always be less than one fourth of the non-speech duration.

Before reporting a word, rejection criteria will be tested. The difference in scores for the candidate word and the second choice will be compared to a threshold or to thresholds which are empirically determined.

In accordance with another aspect of the present invention, the reporting function is also modified. Rather than reporting the score for the non-speech-speech-non-speech sequence which has just been recognized, the score routine traces backwards, normalizes and reports only the score of the speech sequence. This is accomplished by subtracting the score which started the speech sequence from the score ending the speech sequence and dividing by the number of frames from phrase start to phrase finish.

While we have described above the principles of our invention in connection with specific apparatus, it is to be clearly understood that this description is made only by way of example and not as a limitation to the scope of our invention as set forth in the objects thereof and in the accompanying claims.

We claim:

1. An apparatus for recognizing speech sounds contained in audio speech input comprised of sound utterances separated by silences of at least a minimum silence duration, wherein said sound utterances may include non-speech sounds other than ambient noise, comprising:

frame forming means for continuously forming frames of digital signals representative of said speech sounds, silences, and said non-speech sounds;

recognizing means for continuously recognizing said speech sounds, silences and said non-speech sounds from said frames of digital signals;

determining means for determining endpoints of said speech sounds based on the recognition of non-speech-speech-non-speech sequences, wherein the non-speech portions of the respective sequences include recognized silences as well as recognized non-speech sounds other than the ambient noise; and processing means for processing at least the speech portions of the respective sequences demarcated by the determined endpoints in accordance with a predefined syntax.

2. The apparatus of claim 1, wherein said recognizing means includes memory means for storing representations of speech and non-speech sounds as respective speech and non-speech templates, wherein said non-speech templates include a silence template of the minimum silence duration, an ambient noise template for the ambient noise, and multiple non-speech noise templates for noises other than the ambient noise having a duration several times longer than the minimum silence duration; and wherein said processing means includes means responsive to an endpoint determination by said determining means for recognizing said speech and non-speech sounds by comparing the respective frames of original signals with said speech and non-speech templates.

3. A method of recognizing speech sounds contained in audio speech input comprised of sound utterances separated by silences of at least a minimum silence duration, wherein said sound utterances may include non-speech sounds other than ambient noise, comprising the steps of:

storing representations of speech sounds and non-speech sounds as respective speech and non-speech templates in a memory, wherein said non-speech templates include a silence template of the minimum silence duration, an ambient noise template for the ambient noise, and multiple non-speech noise templates for noises other than the ambient noise;

continuously converting said speech sounds, silences and said non-speech sounds into frames of digital signals;

determining endpoints of said speech sounds from respective non-speech-speech-non-speech sequences, including continuously comparing said frames of said speech sounds, silences, and non-speech sounds with said speech and non-speech templates until detection of the respective sequence and processing at least those of said frames in the respective sequence that are representative of speech sounds which are demarcated by the determined endpoints in accordance with a predefined syntax to recognize such speech sounds.

* * * * *